United States Patent [19]

Mathey

[11] 4,254,679

[45] Mar. 10, 1981

[54] AUTOMATIC YARN CUTTING MECHANISM

[75] Inventor: Horst Mathey, Jona, Switzerland

[73] Assignee: Gebrüder Loepfe AG, Zürich, Switzerland

[21] Appl. No.: 849,947

[22] Filed: Nov. 9, 1977

[51] Int. Cl.² .............................................. B23D 17/02

[52] U.S. Cl. ........................................ 83/575; 83/600; 83/601

[58] Field of Search ................. 83/353, 675, 600, 601, 83/605, 606

[56] References Cited

U.S. PATENT DOCUMENTS 769,917 9/1904 Prichard ............................... 83/600

*Primary Examiner*—J. M. Meister

[57] ABSTRACT

An automatic yarn cutting mechanism comprises a supporting structure, a scissor device, an electromagnet, and spring means holding the scissor device and electromagnet in their inoperative positions when the electromagnet is de-energized. The scissor device is provided with a post mounted slidably relative to said supporting structure, and the electromagnet comprises a solenoid and a plunger core or piston operatively connected to said post. The supporting structure is provided with a plate-shaped member, said scissor device and electromagnet being mounted on one side of the plate-shaped member, said slidable post and plunger core extending through said plate-shaped member to the other side thereof and being connected on that other side by a traverse connector.

2 Claims, 2 Drawing Figures

AUTOMATIC YARN CUTTING MECHANISM

BACKGROUND OF THE INVENTION

The present invention refers to an automatically controlled yarn cutting mechanism comprising a supporting structure, a scissor device and an electromagnet for actuating the scissor device. Such cutting devices are generally used on yarn processing machines, such as spinning frames, winding machines, twisters and the like.

In particular, the invention refers to a yarn cutting mechanism wherein the scissor device is slidably mounted on a post which is pushed forward in its longitudinal or axial direction when the electromagnet is energized. In a known mechanism of that type, the scissor device and electromagnet are arranged along a common axis in such a manner that the longitudinal dimension thereof is rather long and in some cases makes impossible mounting the mechanism on a machine.

SUMMARY OF THE INVENTION

It is a primary object of the invention to provide an automatically controllable yarn cutting mechanism which is compact and has a small longitudinal dimension.

Further objectives of the invention will become more readily apparent as the description proceeds.

SHORT DESCRIPTION OF THE DRAWINGS

FIG. 1 shows an embodiment of the inventive cutting mechanism in front view and in its idle position, and FIG. 2 is a side view of a second embodiment of the cutting mechanism.

DETAILED DESCRIPTION OF THE INVENTION

Figure 1:
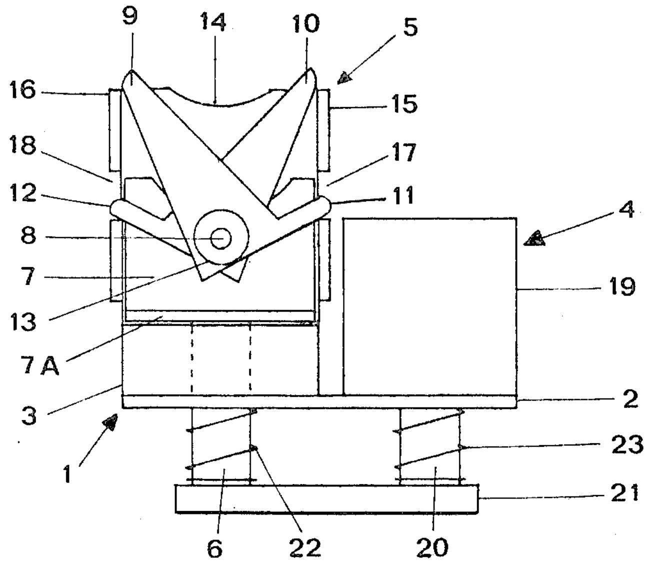

With reference to FIG. 1 the inventive cutting mechanism comprises three main structures, namely a supporting structure 1 consisting of a plate-shaped or base member 2 and a block 3, an electromagnet 4 and a scissor device 5 both mounted on supporting structure 1.

Plate-shaped or base member 2 is preferably made of sheet metal and formed as a substantially rectangular plate. Of course, supporting structure 1 may alternatively be an integral member supporting electromagnet 4 and scissor device 5.

Scissor device 5 comprises a vertically movable or guided post 6 extending through a bore in plate-shaped member 2 and block 3. To the upper end of vertically movable post 6 there is fixedly connected a plate-shaped slide member 7 having a lower edge or flange 7A resting on block 3 in the idle position of the cutting mechanism. A pin 8 is attached to the slide member 7 near the midpoint thereof. Two cooperating scissor blades 9, 10 are pivotably mounted on pin 8 and secured thereto by a retaining disc 13. Each blade 9,10 is provided with a trip arm 11 or 12, respectively, which extends in substantially radial direction outward from pin 8.

A substantially plate-shaped guide structure 14 provided with lateral flanges 15,16 is fixedly attached to block 3 and receives slide member 7 and scissor blades 9,10. Each of the lateral flanges 15,16 is interrupted by a recess 17 or 18, respectively, each receiving the end of a trip arm 11 or 12, respectively.

Electromagnet 4 comprises a solenoid 19 and a plunger core or piston 20 movable in axial direction of solenoid 19. Plunger piston 20 extends downward through a bore in base member 2. The lower ends of vertically movable post 6 and plunger piston 20 are fixedly interconnected by a traverse connector 21. Pressure springs 22,23 hold traverse connector 21 and the movable structure of scissor device 5 comprising guided post 6, slide member 7 and scissor blades 9,10 on the left side, and plunger piston 20 on the right side in their lowermost position shown in the drawing, as long as solenoid 19 is de-energized.

In this de-energized or idle condition of the cutting mechanism, trip arms 11,12 or scissor blades 9,10, respectively, rest on the lower edges of recesses 17,18, respectively, and scissor blades 9,10 form a V-like configuration. Moreover, the upper edge of guide structure 14 prevents yarn from contacting the inner or cutting edges of scissor blades 9,10. When solenoid 19 is energized, plunger piston 20 is lifted, and so are traverse connector 21 and the above mentioned movable structure of scissor device 5. When being lifted, trip arms 11,12 get free of the lower edges of recesses 17,18, respectively, and strike against the upper edges thereof. During the further lifting operation, and since the ends of the trip arms are blocked by said upper edges, scissor blades 9,10 are pivoted inward about pin 9 such that the scissor blades 9,10 are closed in the uppermost position thereof. In this position, traverse connector 21 rests against base member 2. Upon de-energizing solenoid 19, the cutting mechanism returns to the "scissor open" position shown in the drawing, by means of the action of pressure springs 22,23.

Figure 2:
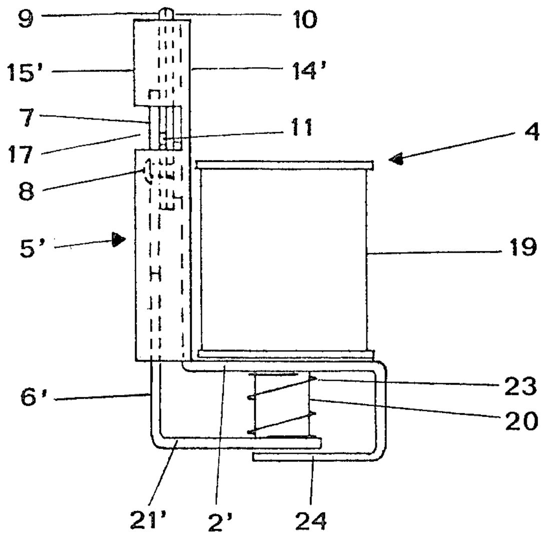

In FIG. 2, components which are structurally identical with those shown in FIG. 1 are labelled with the same reference numerals. However, functionally similar, differently shaped components are designated by the same numerals with a stroke.

Thus, electromagnet 4 comprising solenoid 19 and plunger piston 20 may be arranged in the same manner as shown in FIG. 1. The upper part of scissor device 5′ comprising scissor blades 9,10 fixed to slide member 7 by pin 8 may be shaped as described with reference to FIG. 1. Scissor blades 9,10 are also provided with trip arms 11 and 12, respectively, of which trip arm 11 is visible in FIG. 2.

Differently built is guide structure 14′, one of whose flanges 15′ and associated recess 17 are visible in FIG. 2. Guide structure 14′ is integral with base member 2′ such that a block 3 as shown in FIG. 1 may be omitted.

Slide member 7 is integral with vertically movable post 6′ and traverse connector 21′, such that a guided post 6 as used with the embodiment of FIG. 1 is avoided. Base member 2′ which supports solenoid 19 has an L-shaped extension 24 serving as an abutment for plunger piston 20 and traverse connector 21′ when solenoid 19 is de-energized. Only one pressure spring 23 is provided surrounding plunger piston 20 and acting between base member 2′ and traverse connector 21′.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An automatic yarn cutting mechanism, comprising a scissor device, an electromagnet provided with a plunger piston, and spring means holding the scissor device and plunger piston in their inoperative positions when the electromagnet is de-energized;

the scissor device comprising a movable post fixedly connected to said plunger piston in parallel relationship thereto, a pin connected to said post in transverse relationship thereto, two scissor blades pivotably mounted on said pin, each scissor blade having a trip arm extending radially outward from said pin; and a guide structure arranged in fixed and side-by-side relationship to said electromagnet, said guide structure having two recesses receiving the free ends of said trip arms and limiting their upward and downward movement in a direction parallel to said post and plunger piston.

2. An automatic yarn cutting mechanism, comprising a supporting structure, a scissor device and an electromagnet, and spring means holding the scissor device and electromagnet in their inoperative positions;

the scissor device comprising a post mounted slidably relative to said supporting structure and a pin connected to said post in traverse relationship thereto, two blades pivotably mounted on said pin, each of said blades having a trip arm extending substantially radially outward from said pin, and a guide structure having two recesses for receiving said trip arms; the electromagnet comprising a solenoid and a plunger core operatively connected to said post;

wherein the supporting structure comprises a plate-shaped member, said scissor device and electromagnet being mounted on one side of the plate-shaped member, said slidable post and plunger core extending through said plate-shaped member to the other side thereof and being interconnected on that other side by a traverse connector.

* * * * *